W. H. CORBETT.
HOISTING OR LOGGING DEVICE.
APPLICATION FILED DEC. 28, 1907.

939,670.

Patented Nov. 9, 1909.

WITNESSES

INVENTOR
WILLIAM H. CORBETT
BY Paul & Paul
HIS ATTORNEYS

UNITED STATES PATENT OFFICE.

WILLIAM HARRISON CORBETT, OF PORTLAND, OREGON.

HOISTING OR LOGGING DEVICE.

939,670.  Specification of Letters Patent.  Patented Nov. 9, 1909.

Application filed December 28, 1907. Serial No. 408,349.

*To all whom it may concern:*

Be it known that I, WILLIAM HARRISON CORBETT, of Portland, Multnomah county, Oregon, have invented certain new and useful Improvements in Hoisting or Logging Devices, of which the following is a specification.

The object of my invention is to improve the apparatus shown and described in Letters Patent of the United States, issued to me December 12, 1905, No. 807,109.

The invention consists generally in various constructions and combinations, all as hereinafter described and particularly pointed out in the claim.

Figure 1:
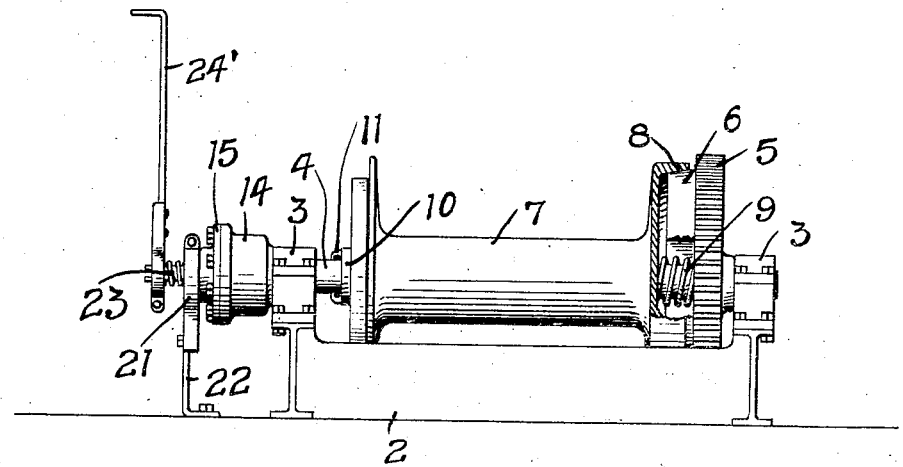
Figure 2:
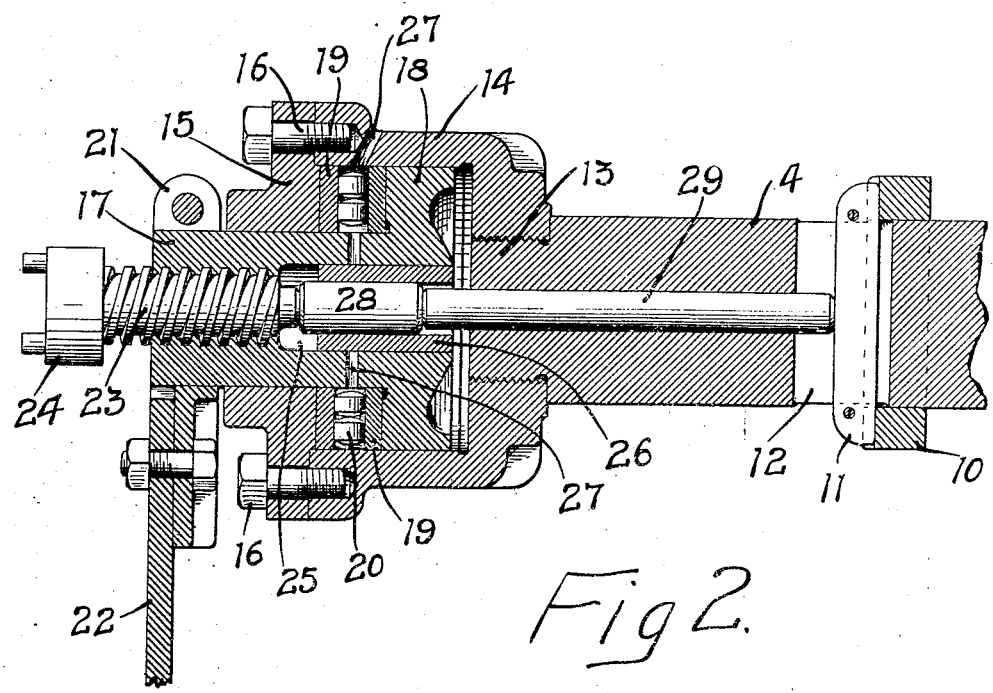

In the accompanying drawings, forming part of this specification, Figure 1 is a side elevation partially in section, of a hoisting drum with my invention applied thereto. Fig. 2 is a detail sectional view illustrating the construction of the clutch operating mechanism.

In the drawing, 2 represents a suitable base having bearings 3 at each end for a shaft 4. A driving gear 5 is secured on this shaft and a friction cone 6 is arranged to revolve with said driving gear. A drum 7 is loosely mounted on said shaft and is provided at one end with a friction band 8 inclosing the cone 6 and adapted to engage the same upon the axial movement of the drum 7. A spring 9 on the shaft 4 tends to hold the friction band 8 out of contact with the cone 6. A collar 10 is provided on the shaft 4 in contact with the drum 7. A key 11 is provided within a slot 12 in the said shaft and engages the collar 10 and is adapted to slide therewith back and forth in said shaft. The shaft 4 has a threaded end 13. A carrier 14 is screwed on to the end of the shaft and is provided with a cover plate 15 held in place by bolts 16. The carrier corresponds substantially to the one shown in my patent above referred to and a nut 17 having an enlarged inner end 18 is journaled within the cover plate 15, and rings 19 with roller bearings 20 between them are interposed between the cover plate and the enlarged inner end or head 18. The nut 17 is interiorly threaded and is held against rotation by a clamp 21 and an arm 22. A screw 23 is provided within the interiorly threaded end and has a head 24 with means for applying a lever 24' thereto. A cylindrical chamber 25 is provided at the inner end of the nut 17, said chamber extending through the enlarged inner end or head 18 and being concentric with the interiorly threaded outer end of said nut. A floating bushing 26, preferably of bronze, is provided within the chamber 25 and is freely movable therein, and oil holes 27 are provided in the wall of the nut 17 leading from the roller bearings to said chamber. A pin 28 is provided within the bushing 26 having its outer end in contact with the thrust screw 23 and its inner end in contact with a pin 29 which engages the key 11.

Upon turning the screw 23 in one direction its thrust will be imparted through the pins 28 and 29 and the key 11 to the drum to compress the spring 9 and move the friction band 8 into contact with the cone 6. Upon turning the screw 23 the other way the thrust on the pins will be relieved and the tension of the spring 9 will return the parts to their normal inoperative position. This manner of operating the friction device of a hoisting drum has been found to be very satisfactory. The mechanism is simple, the operation quick and convenient, the only obstacle being the grinding of the thrust pin and shaft collar, which has sometimes caused serious breakdowns and delays. By using the bronze bushing within the chamber of the nut 17 I am able to increase the durability of this part of the device and provide a convenient and inexpensive construction in case of necessary repairs, the bronze bushing being readily removable when worn or otherwise damaged, and a new one substituted therefor.

I claim as my invention:

The combination, with a shaft, of a drum loosely mounted thereon, a friction device for locking said drum and rendered operative by axial movement thereof in one direction, a carrier provided on one end of said shaft, a nut within said carrier and having an interiorly threaded socket, and a chamber in one end concentric with said socket, a thrust screw fitting in said socket, a loose cylindrical bushing arranged within said chamber between one end of said shaft and said socket, said bushing being of substantially the same diameter from end to end and having a longitudinal and rotary movement within said chamber, a thrust pin fitting within said bushing and contacting with the inner end of said thrust screw, and means interposed between said pin and said drum for transmitting the thrust of said screw to said drum, substantially as described.

In witness whereof, I have hereunto set my hand this 31st day of October 1907.

WILLIAM HARRISON CORBETT.

Witnesses:
R. E. DAVIS,
M. H. INSLEY.